Sept. 25, 1928.
A. F. MASURY
BRAKE
Filed June 10, 1924
1,685,429
2 Sheets-Sheet 1
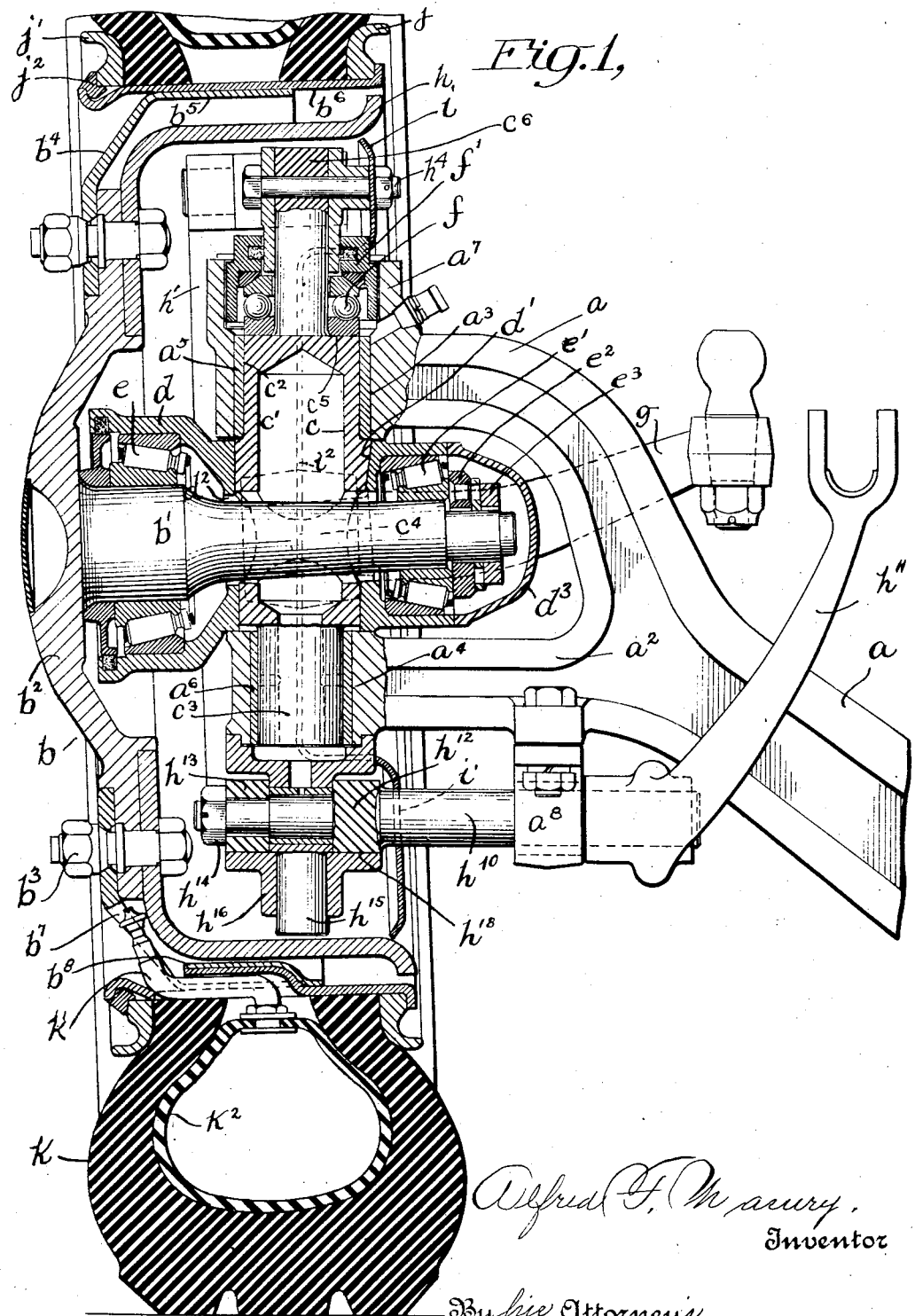
Fig.1,
Alfred F. Masury,
Inventor
By his Attorneys
Redding Greeley O'Shea & Campbell.

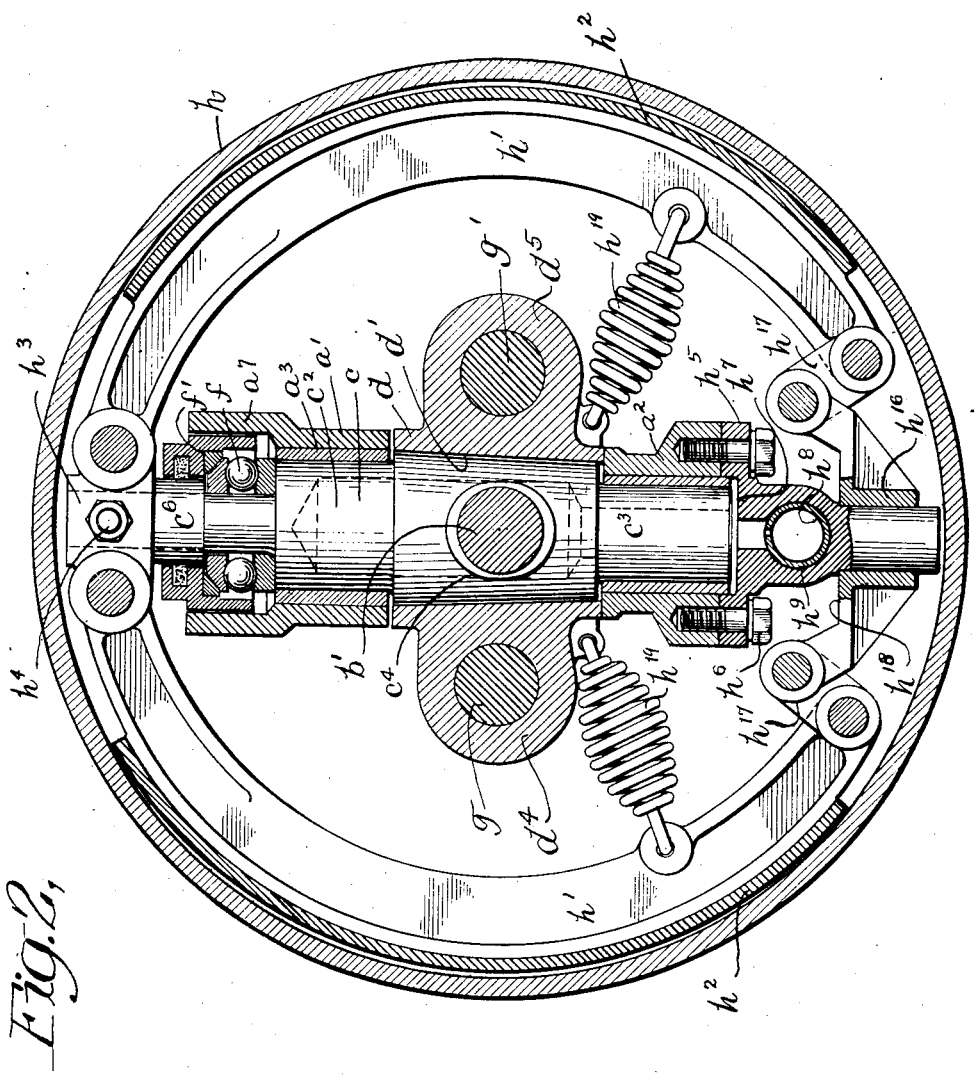

Patented Sept. 25, 1928.

1,685,429

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

BRAKE.

Application filed June 10, 1924. Serial No. 719,225.

This invention relates to front axle construction particularly adapted for motor vehicles and has for its principal object the provision of an improved construction wherein the axle is carried upon a disc wheel through the instrumentality of a particularly compact unitary steering knuckle and knuckle pin and associated bearings and having brake mechanism so associated therewith as to permit the entire structure to be housed within a brake drum carried with the wheel in a manner to permit maximum turning of the wheel in steering. Accordingly a wheel spindle struck out from a disc wheel is adapted to turn within a steering knuckle which supports a knuckle pin passing therethrough and formed with an aperture through which the wheel spindle extends, a thrust bearing being supported at the upper end of the knuckle pin to carry the weight of the axle and its load. Upon the upper extremity of the knuckle pin is mounted an anchor for brake shoes adapted to be moved into frictional engagement with a brake drum carried with the wheel by means of cam actuated toggles supported upon the lower extremity of the knuckle pin. The foregoing combination of elements provides a particularly compact construction which may be contained wholly within the brake drum and may be protected from foreign matter by a dust cap or the like closing the open inner side of the drum and supported upon the brake shoe anchor. Other objects of the invention will be apparent from the following detailed description of the accompanying drawings illustrating a preferred embodiment and in which:

Figure 1 is a fragmentary view partly in section showing so much of a wheel and axle of a motor vehicle looking from the rear as is necessary to illustrate the application of the invention thereto.

Figure 2 is a view showing the disposition of the steering knuckle and brake actuating mechanism within a brake drum.

The bifurcated end of the front axle of a motor vehicle is indicated at $a$ in Figure 1 and is adapted to be supported upon a wheel indicated in general at $b$ by means of the knuckle and knuckle pin construction forming one aspect of the present invention. The upper arm $a'$ and the lower arm $a^2$ of the front axle are apertured as at $a^3$, $a^4$, respectively, to receive a knuckle pin $c$, suitable bushings $a^5$, $a^6$ being disposed in the apertures $a^3$, $a^4$, respectively to serve as bearings for the knuckle pin rotating therein. The main portion of the knuckle pin is hollow as at $c'$ in order that the weight thereof may be reduced and cylindrical bearing surfaces $c^2$, $c^3$ are formed thereon to engage the bushings $a^5$, $a^6$, respectively. Centrally of the main portion of the knuckle pin is an aperture $c^4$ through which is adapted to pass the wheel spindle $b'$ which is formed integrally with the disc $b^2$ of the wheel. Knuckle pin $c$ is supported upon knuckle $d$ through the bevel bearing surfaces $d'$. The knuckle is likewise provided with an aperture $d^2$ corresponding to the aperture $c^4$ for the passage of wheel spindle $b'$ and the knuckle is supported upon the spindle by any usual bearings which are illustrated in Figure 1 as roller bearings $e$, $e'$ both of which are disposed within the knuckle and the bearing $e'$ being adjustable for wear by the lock washer $e^2$ and lock nut $e^3$, a suitable dust cap $d^3$ being secured to the inner end of the knuckle to protect the bearings from foreign matter. From the foregoing description it will be apparent that upon rotation of the wheel the wheel spindle $b'$ which is carried as a unit therewith turns within a knuckle and knuckle pin structure which turns, in steering, as a unit within the bushings $a^5$, $a^6$. The upper arm $a'$ is formed with an extension $a^7$ and within this extension is disposed a thrust bearing $f$ which rests upon a top edge $c^5$ of the knuckle pin and serves to support the axle through the thrust bearing adjusting nut $f'$ threaded into the extension $a^7$. It will thus be apparent that the load carried by the axle will be supported upon the unitary knuckle and knuckle pin through the thrust bearing $f$ and which load in turn will be supported upon the wheel spindle $b'$ through the bearings $e$, $e'$. In steering, as has been pointed out before, the knuckle $d$ and knuckle pin $c$ turn as a unit due to the face that the weight of the axle and its load maintains the knuckle pin solid upon the tapered seat $d'$. The means for effecting steering of the wheel include bosses $d^4$, $d^5$ disposed upon the forward and rear sides of knuckle $d$, respectively, the boss $d^4$ receiving the steering drag link lever $g$ and the boss $d^5$ receiving the steering cross tube lever $g'$ which extends between the two front wheels. The front axle construction according to the present invention also contemplates the provision of brake mechanism for the front wheels. To this end the wheel disc $b^2$ has secured thereto upon its inner side the brake drum $h$ which is adapted to be engaged by brakes shoes $h'$, $h'$ provided with suitable friction surfaces $h^2$. Brake shoes $h'$ are pivoted upon a brake shoe anchor $h^3$ which is secured as by a bolt $h^4$ to a cylindrical extension $c^6$ of the knuckle pin whereby the brake anchor and its associated parts may rotate in the same vertical plane as the wheel and the knuckle and knuckle pin structure. To the lower face of the arm $a^2$ and immediately below the knuckle pin is secured a bearing $h^5$, as by screws $h^6$, a suitable clearance $h^7$ being provided for the end of the knuckle pin and bushing $a^6$ therefore in case of wear. A bushing $h^8$ is disposed in an aperture $h^9$ within bearing $h^5$ for the reception of the cam shaft $h^{10}$ which is journaled in suitable manner upon the arm $a^2$ of the axle as at $a^8$ and is adapted to be rotated by the lever arm $h^{11}$. A cam $h^{12}$ is formed upon the rock shaft $h^{10}$ for positioning inwardly of the bearing $h^5$ and the outer end of the rock shaft is formed to receive a cam $h^{13}$ secured in place by a nut $h^{14}$ threaded over the end of the shaft. The lower end of the bearing $h^5$ is formed as a cylindrical spindle $h^{15}$ upon which is adapted to slide a slide $h^{16}$ secured as by links $h^{17}$ to the ends of the respective brake shoes and formed with bearing surfaces $h^{18}$ against which the cams bear. Upon movement of lever $h^{11}$ by means of a rod or the like secured to the bifurcated end thereof the cam shaft $h^{10}$ will be revolved about its own axis to cause the cams $h^{12}$, $h^{13}$ to bear against the surface $h^{18}$ and by a sort of toggle connection through the link $h^{17}$ to apply braking power to the brake drum $h$. Upon opposite movement of the arm $h^{11}$ which will cause the cams to rotate out of engagement with the slide $h^{16}$ the springs $h^{19}$, $h^{19}$ will serve to draw the shoes away from the brake drum and elevate the slide therewith.

In order to protect the interior of the brake drum from foreign matter a circular shield $i$ of a diameter substantially that of the interior of the brake drum is adapted to be secured by the bolt $h^4$ to the brake anchor $h^3$ and is provided diametrically opposite thereto by an aperture $i'$ for the passage of the cam shaft $h^{10}$ which also serves to maintain the shield in position. Upon either side of the knuckle pin the dust cap may be offset as at $i^2$ so as to allow for the maximum steering arc for the wheel. Outwardly of the disc $b^3$ and preferably secured thereto by the same bolts $b^3$ that secure the brake drum to the disc is a disc member $b^4$ bent at its upper end to form a bearing surface $b^5$ for the rim $b^6$ of the wheel. Any convenient means such as the rings $j$, $j'$ and ring $j^2$ may be provided to secure the tire $k$ demountably upon the rim, a suitable aperture $b^7$ and offset portion $b^8$ being provided at any convenient place in the periphery of the rim for the reception of a valve tube $k'$ of an inner inflatable tube $k^2$ when pneumatic tubes are intended to be used upon the wheel.

It will thus be seen that a particularly compact structure has been provided which has the requisite strength, is simple in its construction and easy of assembly and disassembly and which permits the association of steering and brake mechanism with the front wheel of a vehicle in a manner to take up little room while at the same time being readily accessible.

Various changes in the construction and disposition of the elements described hereinbefore will occur to those skilled in the art and are to be deemed within the scope of the present invention, no limitation being intended except as indicated in the appended claim.

What I claim is:

In a wheel having a spindle formed integrally with the wheel disc and a brake for the wheel, a knuckle for the spindle, a knuckle pin rigidly secured to said knuckle and carried with an axle to permit turning of the wheel, brake shoes, an extension on the upper end of the knuckle pin for anchoring the brake shoes to the knuckle pin, a bearing, a mount therefor on the axle below the knuckle pin, said mount closing the bottom of the knuckle pin aperture, as well as housing the bearing, and means mounted on said bearing and on the axle to apply said brake shoes.

This specification signed this 6 day of June, A. D. 1924.

ALFRED F. MASURY.